US012315989B2

(12) United States Patent
Zhang et al.

(10) Patent No.: US 12,315,989 B2
(45) Date of Patent: May 27, 2025

(54) INTEGRATED BASE STATION ANTENNA

(71) Applicant: Outdoor Wireless Networks LLC, Claremont, NC (US)

(72) Inventors: Xun Zhang, Suzhou (CN); Hangsheng Wen, Suzhou (CN); Nengbin Liu, Suzhou (CN); Yutong Liu, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 221 days.

(21) Appl. No.: 18/082,748

(22) Filed: Dec. 16, 2022

(65) Prior Publication Data

US 2023/0208014 A1 Jun. 29, 2023

(30) Foreign Application Priority Data

Dec. 23, 2021 (CN) ......................... 202111586457.1

(51) Int. Cl.

| | |
|---|---|
| ***H01Q 1/24*** | (2006.01) |
| ***H01Q 1/42*** | (2006.01) |
| ***H01Q 19/185*** | (2006.01) |
| ***H01Q 21/00*** | (2006.01) |

(52) U.S. Cl.
CPC ............... *H01Q 1/246* (2013.01); *H01Q 1/42* (2013.01); *H01Q 19/185* (2013.01); *H01Q 21/00* (2013.01)

(58) Field of Classification Search
CPC ........ H01Q 1/246; H01Q 1/42; H01Q 19/185; H01Q 21/00; H01Q 5/378; H01Q 19/06
See application file for complete search history.

(56) References Cited

U.S. PATENT DOCUMENTS

2014/0333501 A1* 11/2014 Chainon ................ H01Q 21/00 343/833

FOREIGN PATENT DOCUMENTS

CN 104347958 A * 2/2015

* cited by examiner

*Primary Examiner* — Dieu Hien T Duong
(74) *Attorney, Agent, or Firm* — Myers Bigel, P.A.

(57) ABSTRACT

An integrated base station antenna comprises a passive antenna and an active antenna installed behind the passive antenna. The active antenna comprises a reflecting plate and an array of radiating elements extending forward from the reflecting plate. The passive antenna includes an array of metal tuning elements that tune the array of radiating elements, where the array of metal tuning elements us positioned in front of the array of radiating elements of the active antenna, and where a longitudinal axis of at least some of the metal tuning elements extend at an angle between 70° and 110° with respect to a plane defined by the reflecting plate.

16 Claims, 7 Drawing Sheets

INTEGRATED BASE STATION ANTENNA

CROSS-REFERENCE TO RELATED APPLICATION

The present application claims priority to Chinese Patent Application No. 202111586457.1, filed Dec. 23, 2021, the entire content of which is incorporated herein by reference as if set forth fully herein.

FIELD

The present disclosure relates to a communication system, more specifically, to an integrated base station antenna, which includes a passive antenna device and an active antenna device.

BACKGROUND

With the development of wireless communication technology, an integrated base station antenna that includes both a passive antenna and an active antenna has emerged. The passive antenna may include one or more arrays of radiating elements that are configured to generate relatively static antenna beams, such as antenna beams that are configured to cover a 120 degree sector (in the azimuth plane). The arrays may include arrays that operate, for example, under second generation (2G), third generation (3G) or fourth generation (4G) cellular network standards. These arrays are not configured to perform active beamforming operations, although they typically have remote electronic tilt (RET) capabilities which allow the shape of the antenna beams generated by the arrays to be changed via electromechanical means in order to change the coverage area of the antenna beams. The active antenna may include one or more arrays of radiating elements that operate under fifth generation (5G or higher version) cellular network standards. In 5G mobile communication, the frequency range of communication includes a main frequency band (specific portion of the range 450 MHZ-6 GHZ) and an extended frequency band (24 GHZ-73 GHZ, i.e. millimeter wave frequency band, mainly 28 GHz, 39 GHz, 60 GHz and 73 GHZ). The frequency range used in 5G mobile communication includes frequency bands that use higher frequencies than the previous generations of mobile communication. These arrays typically have individual amplitude and phase control over subsets of the radiating elements therein and perform active beamforming.

In fifth generation mobile communication systems, the cross-polarization performance requirements for active antennas may be high. Moreover, since the active antenna is positioned behind the passive antenna, the passive antenna may negatively impact the cross-polarization performance of the active antenna.

In addition, the cross-polarization performance of the active antenna may differ as a function of the scanning angle of the antenna beam generated by the active antenna. For example, in some cases, at small horizontal (i.e., azimuth plane) scanning angles, e.g., around 0°, the active antenna tends to have good cross-polarization performance (e.g., good cross-polarization discrimination); however at large horizontal scanning angles, e.g., around 47°, it the active antenna may exhibit relatively poor cross-polarization performance. Therefore, it is desirable to provide different tuning elements for small horizontal scanning angles and large horizontal scanning angles respectively (e.g., small tuning elements for small horizontal scanning angles and large tuning elements for large horizontal scanning angles) in order to maintain good cross-polarization performance over a wide scanning angle range. However, the installation of tuning elements is limited by the compact available space in the active antenna. Therefore, it is also desirable to improve the available space in integrated base station antennas.

SUMMARY

According to a first aspect of the present disclosure, an integrated base station antenna is provided, comprising: a passive antenna; and an active antenna installed behind the passive antenna, wherein the active antenna comprising a reflecting plate and an array of radiating elements extending forward from the reflecting plate, wherein an array of metal tuning elements used for the array of radiating elements is mounted in the passive antenna, the array of metal tuning elements positioned right in front of the array of radiating elements of the active antenna, and wherein a longitudinal axis of at least some of the metal tuning elements extend at an angle between 70° and 110° with respect to a plane defined by the reflecting plate.

According to a second aspect of the present disclosure, an integrated base station antenna is provided, comprising: a passive antenna; and an active antenna installed behind the passive antenna, the active antenna comprising a reflecting plate and an array of radiating elements extending forward from the reflecting plate, wherein an array of metal tuning elements for the array of radiating elements is installed in the passive antenna, the array of metal tuning elements is right in front of the array of radiating elements of the active antenna, and the array of metal tuning elements is printed on a plurality of printed circuit board (PCB) components, and at least one column of metal tuning elements is printed on each PCB component respectively.

According to a third aspect of the present disclosure, an integrated base station antenna is provided, comprising: a passive antenna; and an active antenna installed behind the passive antenna, the active antenna comprising a reflection plate and an array of radiating elements extending forward from the reflection plate, wherein an array of metal tuning elements for the array of radiating elements is installed in the passive antenna, which is right in front of the array of radiating elements of the active antenna and is configured to: provide a first projection component in the horizontal direction at a horizontal scanning angle larger than the first angle, and a second projection component in the longitudinal direction at a horizontal scanning angle smaller than the second angle, the second projection component being larger than the second projection component.

Figure 1:
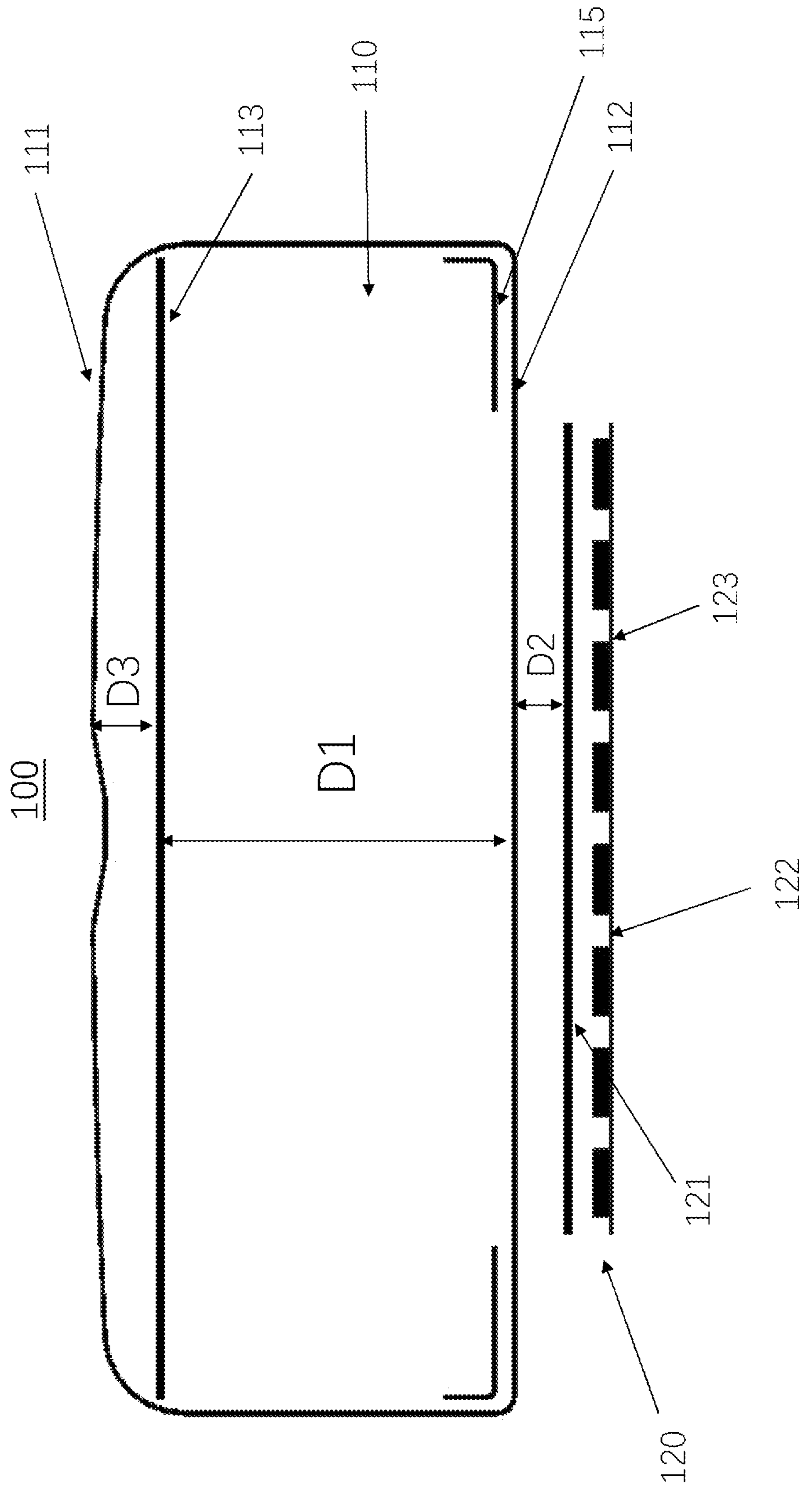
FIG. 1 shows a schematic bottom view of an integrated base station antenna according to some embodiments of the present disclosure.

Note, in the embodiments described below, the same reference signs are sometimes jointly used between different attached drawings to denote the same parts or parts with the same functions, and repeated descriptions thereof are omitted. In some cases, similar labels and letters are used to indicate similar items. Therefore, once an item is defined in one attached drawing, it does not need to be further discussed in subsequent attached drawings.

For ease of understanding, the position, dimension, and range of each structure shown in the attached drawings and the like sometimes may not indicate the actual position, dimension, and range. Therefore, the present disclosure is not limited to the positions, dimensions, and ranges disclosed in the attached drawings and the like.

DETAILED DESCRIPTION

The present disclosure will be described below with reference to the attached drawings, wherein the attached drawings illustrate certain embodiments of the present disclosure. However, it should be understood that the present disclosure may be presented in many different ways and is not limited to the embodiments described below; in fact, the embodiments described below are intended to make the disclosure of the present disclosure more complete and to fully explain the protection scope of the present disclosure to those of ordinary skill in the art. It should also be understood that the embodiments disclosed in the present disclosure may be combined in various ways so as to provide more additional embodiments.

It should be understood that the terms used herein are only used to describe specific examples, and are not intended to limit the scope of the present disclosure. All terms used herein (including technical terms and scientific terms) have meanings normally understood by those skilled in the art unless otherwise defined. For brevity and/or clarity, well-known functions or structures may not be further described in detail.

As used herein, when an element is said to be "on" another element, "attached" to another element, "connected" to another element, "coupled" to another element, or "in contact with" another element, etc., the element may be directly on another element, attached to another element, connected to another element, coupled to another element, or in contact with another element, or an intermediate element may be present. In contrast, if an element is described as "directly" "on" another element, "directly attached" to another element, "directly connected" to another element, "directly coupled" to another element or "directly in contact with" another element, there will be no intermediate elements. As used herein, when one feature is arranged "adjacent" to another feature, it may mean that one feature has a part overlapping with the adjacent feature or a part located above or below the adjacent feature.

In this Specification, elements, nodes or features that are "connected" together may be mentioned. Unless explicitly stated otherwise, "connected" means that one element/node/feature can be mechanically, electrically, logically or otherwise connected with another element/node/feature in a direct or indirect manner to allow interaction, even though the two features may not be directly connected. That is, "connected" means direct and indirect connection of components or other features, including connection using one or a plurality of intermediate components.

As used herein, spatial relationship terms such as "upper", "lower", "left", "right", "front", "back", "high" and "low" can explain the relationship between one feature and another in the drawings. It should be understood that, in addition to the orientations shown in the attached drawings, the terms expressing spatial relations also comprise different orientations of a device in use or operation. For example, when a device in the attached drawings rotates reversely, the features originally described as being "below" other features now can be described as being "above" the other features ". The device may also be oriented by other means (rotated by 90 degrees or at other locations), and at this time, a relative spatial relation will be explained accordingly.

As used herein, the term "A or B" comprises "A and B" and "A or B", not exclusively "A" or "B", unless otherwise specified.

As used herein, the term "exemplary" means "serving as an example, instance or explanation", not as a "model" to be accurately copied ". Any realization method described exemplarily herein may not be necessarily interpreted as being preferable or advantageous over other realization methods. Furthermore, the present disclosure is not limited by any expressed or implied theory given in the above technical field, background art, published contents or embodiments.

As used herein, the word "basically" means including any minor changes caused by design or manufacturing defects, device or component tolerances, environmental influences, and/or other factors. The word "basically" also allows for the divergence from the perfect or ideal situation due to parasitic effects, noise, and other practical considerations that may be present in the actual realization.

In addition, for reference purposes only, "first", "second" and similar terms may also be used herein, and thus are not intended to be limitative. For example, unless the context clearly indicates, the words "first", "second" and other such numerical words involving structures or elements do not imply a sequence or order.

It should also be understood that when the term "comprise/include" is used herein, it indicates the presence of the specified feature, entirety, step, operation, unit and/or component, but does not exclude the presence or addition of one or a plurality of other features, steps, operations, units and/or components and/or combinations thereof.

The base station antenna is an elongated structure that extends along a longitudinal axis. The base station antenna may include a front radome, a rear radome, a top end cap and a bottom end cap which includes a plurality of connectors mounted therein. The base station antenna is typically mounted in a basic vertical configuration (i.e., the longitudinal axis L (see FIG. 4) may be generally perpendicular to a plane defined by the horizon when the base station antenna is under normal operation).

Refer to FIG. 1, which shows a schematic bottom view of integrated base station antennas according to some embodiments of the present disclosure. The integrated base station antenna 100 may include a passive antenna 110 and an active antenna 120 mounted on the back of the rear radome 112 of the passive antenna 110.

The passive antenna 110 may include a front radome 111, a rear radome 112 and one or more arrays (not shown in FIG. 1) of radiating elements located between the front radome and the rear radome. These arrays are mounted to extend forwardly from a reflector of the passive antenna 110 and these arrays may include arrays that operate under second generation (2G), third generation (3G) or fourth generation (4G) cellular network standards.

The active antenna 120 may include its own front radome 121, rear radome and one or more arrays 123 of radiating elements located between the front radome and the rear radome. These arrays are mounted to extend forwardly from a reflector 122 of the active antenna 120 and these arrays may include arrays that operate under fifth generation or next generation (5G or 6G) cellular network standards. In 5G mobile communication, the frequency range of communication includes a main frequency band (specific portion of the range 450 MHZ-6 GHz) and an extended frequency band (24 GHZ-73 GHZ, i.e. millimeter wave frequency band, mainly 28 GHZ, 39 GHz, 60 GHz and 73 GHz) . . .

Dielectric materials that form the radome (such as front radome and/or rear radome) of the passive antenna 110 typically have frequency selectivity to electromagnetic waves. Typically, the higher the frequency of the electromagnetic waves, the greater the effect that the dielectric materials may have on the electromagnetic waves. In particular, as the reflectivity of the dielectric materials tends to increase with increasing frequency of the electromagnetic waves, and hence the transmittance of the electromagnetic waves through the dielectric materials decreases. Decreased transmittance reduces the signal strength of the electromagnetic waves, thereby causing the gain of the base station antenna to decrease. The higher the reflectivity, the more the electromagnetic waves are reflected by the radome and these reflected waves superimpose with electromagnetic waves radiated by the radiating elements, which cause jitters and ripples in the radiation pattern.

In order to compensate the adverse effects of the radome of the passive antenna 110, such as the front radome 111, on the electromagnetic waves emitted by the active antenna 120, a matching dielectric layer 113 may be provided in the passive antenna 110, where the matching dielectric layer 113 may be arranged between the array of radiating elements 123 of the active antenna 120 and the front radome 111 of the passive antenna 110. The matching dielectric layer 113 may have a certain thickness and dielectric constant, and the dielectric constant of the matching dielectric layer 113 is larger than the dielectric constant of air. Design personnel may adjust the reflection of the electromagnetic waves from the active antenna 120 by designing the thickness and dielectric constant of the matching dielectric layer 113 such that these reflected waves superimpose out of phase and even anti-phase to reduce the reflectivity of the entire radome (the front and back radomes of the passive antenna, thereby allowing the reflectivity and transmittance of the entire radome to meet the design goals. Specific design parameters of the matching dielectric layer 113 are not limited herein. It should be understood that in some embodiments, the matching dielectric layer 113 may also not be provided.

The present disclosure also recognizes that the cross-polarization performance of the active antenna 120 may be negatively influenced by the array layout of the active antenna 120 with respect to the passive antenna 110 positioned in front of the active antenna 120. In order to reduce this negative influence, the present disclosure provides an array of metal tuning elements 200 for the active antenna 120 that may maintain good cross-polarization performance for the active antenna 120 over a wide scanning angle range.

Figure 3:
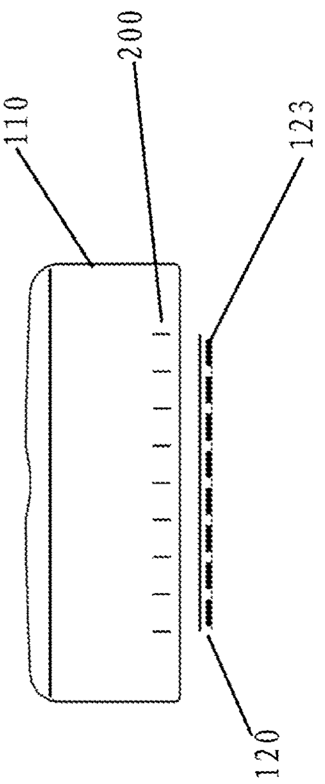
FIG. 3 shows a schematic bottom view of the integrated base station antenna of FIG. 2.
Figure 2:
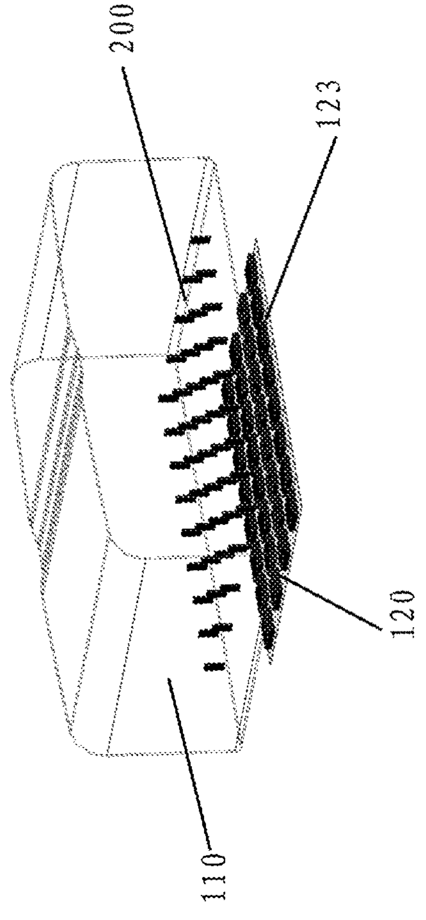
FIG. 2 shows a simplified schematic perspective view of an integrated base station antenna according to some embodiments of the present disclosure, in which an array of tuning elements that is located in front of the array of radiating elements of the active antenna device is schematically shown.

FIGS. 2 and 3 schematically illustrate the array of metal tuning elements 200. As shown, the array of metal tuning elements 200 may be positioned right in front of the array of radiating elements 123 of the active antenna 120. "Right in front" should be understood as at least partial overlap between the array of metal tuning elements 200 and the array of radiating elements in the forward direction F (see FIG. 4). In some cases, there may not be sufficient room in the active antenna 120 for the array of metal tuning elements 200. In such cases, the array of metal tuning elements may alternatively be mounted in the passive antenna 110. Based on the new layout design for the passive antenna 110, which will be described in detail below, the internal space within the passive antenna may be more efficiently utilized. As a result, there may be room for one or more metal tuning element arrays 200 within the passive antenna 110 that may be used to tune the radiation performance of high-frequency electromagnetic waves emitted by the active antenna 120.

In the traditional design for an integrated base station antenna, the passive antenna typically includes a concave rear radome 112 so that the active antenna 120 may extend forwardly into the space defined by the concave rear radome of the the passive antenna 110. in contrast, certain embodiments of the integrated antennas disclosed herein may have rear radomes 112 that are substantially flat or that even protrude backwardly. In this way, the available space within the passive antenna 110 can be increased.

Advantageously, in order to further reduce the adverse reflection of electromagnetic waves emitted by the active antenna 120 by the passive antenna 110, designers may adjust the reflection of electromagnetic waves from the active antenna 120 by designing the distance between the front radome 121 of the active antenna 120, the rear radome 112 of the passive antenna 110, the optional matching dielectric layer 113 and the front radome 111 of the passive antenna 110, so that these reflected waves are superposed out of phase or even have opposite phases to reduce the reflectivity of the whole passive antenna 110, enabling the reflectivity and transmittance of the passive antenna 110 on the electromagnetic waves emitted by the active antenna 120 to meet the design goals.

Specifically, this disclosure provides as follows: for the portion of the passive antenna that overlaps the active antenna 120 when viewed from the forward direction, the distance between the rear radome of the passive antenna 110 and the matching dielectric layer 113 is up to a first distance D1, and the distance between the active antenna 120, such as the front radome thereof, and the rear radome of the passive antenna 110 is up to a second distance D2. The first distance may be selected as 0.25+n/2 times that of the equivalent wavelength, where n is a positive integer (such as 1, 2, 3, 4, . . . ) and the second distance may be selected as 0.25+N/2 times of the equivalent wavelength, where Nis a natural number (such as 0, 1, 2, . . . ). The equivalent wavelength refers to a wavelength corresponding to the center frequency of the operating frequency band of the radiating elements in the active antenna 120, such as the theoretical wavelength in an air medium or in vacuum. In other words, the selection of the first distance D1 and the second distance D2 in the passive antenna 110 is related to the operating frequency band of the radiating elements in the active antenna 120. By selecting an appropriate distance, the reflection of the electromagnetic waves from the active antenna 120 by the passive antenna 110 may be effectively reduced.

Advantageously, the distance between the matching dielectric layer 113 and the front radome of the passive antenna 110 may be up to a third distance D3, which may be selected as 0.25+M/2 times the equivalent wavelength, where M is a natural number (such as 0, 1, 2 . . . ).

In some embodiments, the equivalent wavelength may be within the range of 0.8 to 1.2 times the wavelength corresponding to the center frequency. In some embodiments, the equivalent wavelength may be within the range of 0.9 to 1.1 times the wavelength corresponding to the center frequency. In some embodiments, the equivalent wavelength may be equivalent to the wavelength corresponding to the center frequency.

As an example, where the operating frequency band of the radiating elements in the active antenna 120 is 2.2-4.2 GHz, the center frequency may be selected as 3.2 GHZ. The wavelength corresponding to the center frequency may be approximately 90 mm. When the equivalent wavelength is equivalent to the wavelength corresponding to the center frequency, the first distance D1 may be 67.5 mm (n=1), 112.5 mm (n=2), 157.5 mm (n=3) . . . 67.5+(n−1)*45 mm, and the specific size may be determined based on actual needs. At the same time, the second distance D2 may be selected as 22.5+N*45 mm, and the third distance D3 may be selected as 22.5+M*45 mm. Typically, in order to reduce the size of the base station antenna, N and M may be selected as 0.

It should be understood that as the front radomes 111 and 121, rear radome 112 and matching dielectric layer 113 may not be flat throughout, only the distance within a partial area may be considered (such as the range corresponding to the active antenna 120), for example, the average distance.

It should be understood that the aforementioned matching dielectric layer 113 does not necessarily have to be provided. In some embodiments, the integrated base station antenna 100 does not include the matching dielectric layer 113 and in this case, the layout parameters may be set as follows: for the portion of the passive antenna that overlaps the active antenna 120 when viewed from the forward direction, the distance between the rear radome 111 of the passive antenna 110 and the front radome 112 of the passive antenna 110 is up to the first distance, and the distance between the active antenna 120, such as the front radome 121 thereof, and the rear radome 112 of the passive antenna 110 is up to the second distance, in which, the first distance is selected as 0.25+n/2 times of the equivalent wavelength, where n is a positive integer and the second distance is selected as 0.25+N/2 times of the equivalent wavelength, where N is a natural number.

Next, referring to FIGS. 4 and 5, the detailed installation structure diagram of the array of metal tuning elements 200 in the passive antenna 110 will be described in detail.

Figure 4:
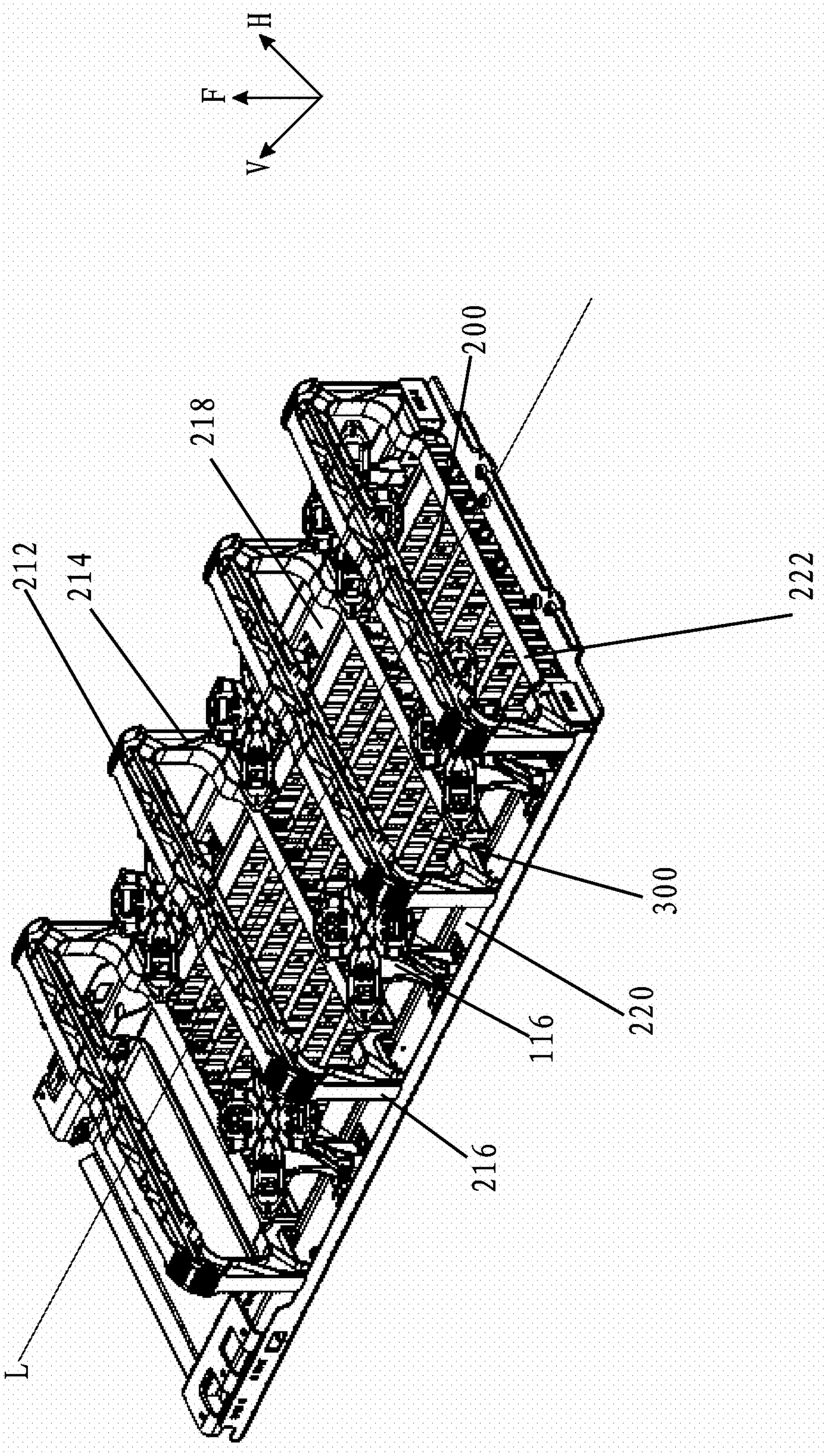
FIG. 4 shows a partial perspective view of the integrated base station antenna of FIG. 2.
Figure 5:
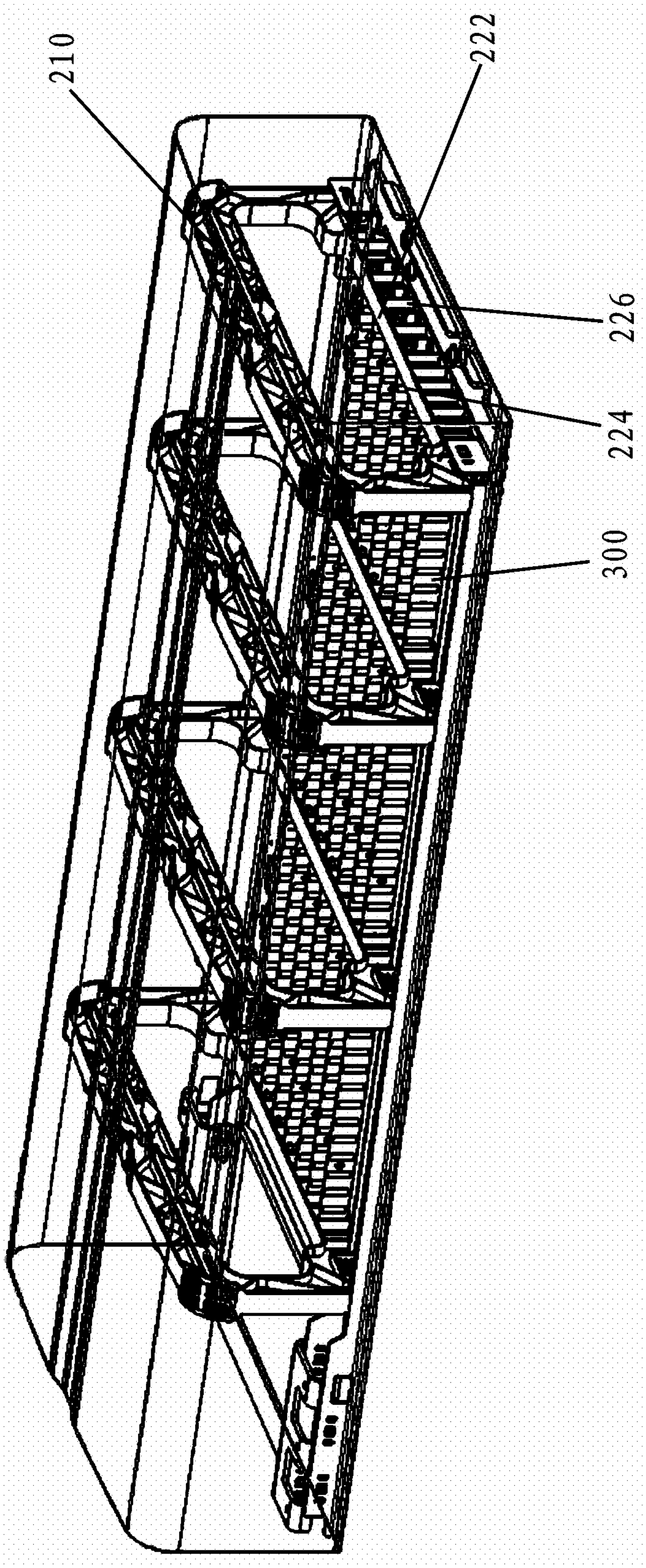
FIG. 5 shows a view of the integrated base station antenna of FIG. 4 with a radome.

As shown in FIGS. 4 and 5, the array of metal tuning elements 200 can be mounted on the support frame 210 that supports the front radome 111 of the passive antenna 110. The metal tuning elements in the array 200 may be electrically floating, meaning that the metal tuning elements are not in direct electrical contact with other conductive structures, such as reflective plates. The array of metal tuning elements 200 can be configured to improve the cross-polarization performance of the active antenna 120 at a small horizontal scanning angle and/or a large horizontal scanning angle, such as peak cross-polarization discrimination rate.

In some embodiments, the array of metal tuning elements 200 may be configured to: improve the peak cross-polarization discrimination rate of the antenna beams generated by the active antenna 120 at a horizontal scanning angle larger than a first angle and/or to improve the peak cross-polarization discrimination rate of the antenna beams generated by the active antenna 120 at a horizontal scanning angle smaller than a second angle.

In some embodiments, the array of metal tuning elements 200 may be configured to: improve the peak cross-polarization discrimination rate by at least 2 dB at a horizontal scanning angle greater than the first angle (e.g., 41°~53°), and/or to improve the peak cross-polarization discrimination rate by at least 2 dB at a horizontal scanning angle smaller than the second angle (e.g., 0°~12°).

Each metal tuning element can be constructed as an elongated metal element. The longitudinal axis M of each metal tuning element may extend at an angle of 70° ~110°, 80° ~ 100° or basically 90° with respect to a plane defined by the reflecting plate 122 of the active antenna 120. In the present disclosure, the extension size of the tuning element on its longitudinal axis M is different from its lateral extension size, Different extension ratios may be set according to the actual needs of the active antenna 120. Through simulation and experimental verification, it is found that stronger resonance compensation is required in the longitudinal direction in the current embodiment. That is to say, the extension size of the tuning element on its longitudinal axis M may be larger than its lateral extension size, for example, 2 times, 3 times or even 5 times larger than its lateral extension size. Based on the (e.g., smaller) lateral extension size of the tuning element, the tuning element can provide a (e.g., smaller) projection component along the longitudinal direction V (see FIG. 4) at a small horizontal scanning angle, and based on the (e.g., larger) longitudinal extension size of the tuning element, the tuning element can provide a (e.g., larger) projection component along the longitudinal direction V (see FIG. 4) at a large horizontal scanning angle. Based on these projection components, the array of metal tuning elements 200 according to the present disclosure can provide different amounts of tuning for small horizontal scanning angles and large horizontal scanning angles, that is, improve the cross-polarization performance of the active antenna 120 not only at small horizontal scanning angles but also at large horizontal scanning angles, so as to maintain good cross-polarization performance over a wide scanning angle range.

In the embodiment shown in FIGS. 4 and 5, a plurality of support frames 210 spaced apart from each other are installed along the longitudinal axis L of the base station antenna. Each support frame 210 may include a support beam 212 at the front end extending in the horizontal direction H, a first support leg 214 extending rearward from a first end of the support beam 212, and a second support leg 216 extending rearward from a second end of the support beam 212. A first reflection strip 218 and a second reflection strip 220 (which each may be part of the reflector of the passive antenna 110) are respectively arranged beside the side of the passive antenna 110 in the horizontal direction H, and the first support leg 214 may be mounted on the first reflection strip 218 and the second support leg 216 may be mounted on the second reflection strip 220.

In order not to hinder the high-frequency electromagnetic waves emitted by the active antenna 120, the reflector in the passive antenna 110 may include a large opening. The active antenna 120 may be installed at a position corresponding to the opening so that the high-frequency electromagnetic waves emitted by the active antenna 120 pass through the opening. Radiating elements of the passive antenna 110 may be mounted on the first reflective strip 218 and second reflective strip 220. For example, as shown in FIG. 4, low-frequency band radiating elements 116 may be mounted on the reflective strips 218 and 220, respectively, which for example, may be configured to provide services in at least part of the operating frequency band of 617~960 MHz.

Figure 6:
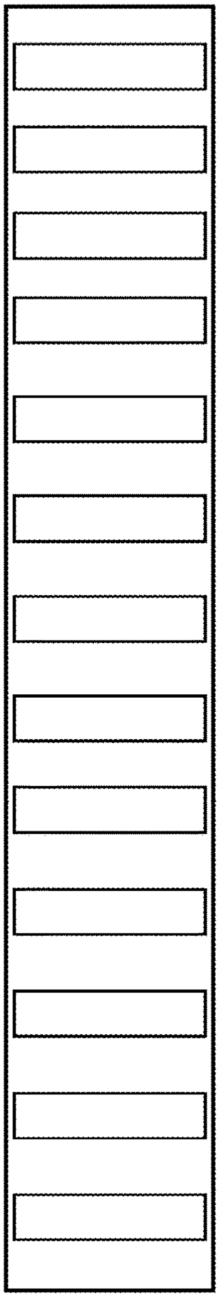
FIG. 6 shows a schematic diagram of a printed circuit board based tuning element included in the integrated base station antenna of FIG. 4.
Figure 7A:
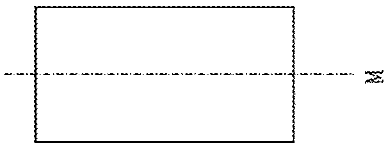
FIGS. 7*a*, 7*b*, 7*c*, 7*d*, 7*e*, 7*f* and 7*g* show seven exemplary variant schemes of tuning elements in integrated base station antennas according to some embodiments of the present disclosure.
Figure 7B:
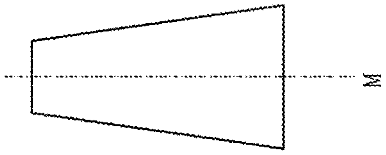
Figure 7C:
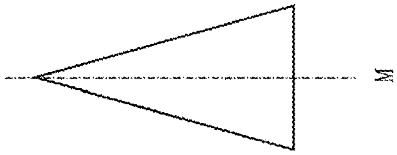
Figure 7D:
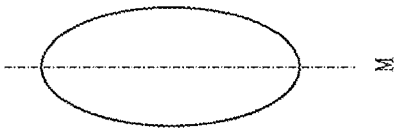
Figure 7E:
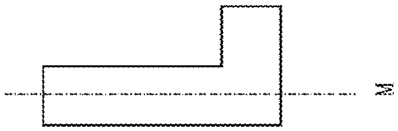
Figure 7F:
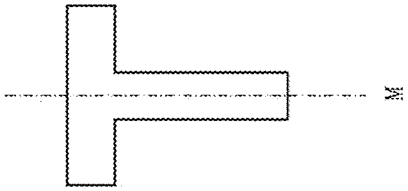
Figure 7G:
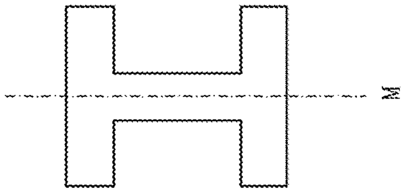

The support frame 210 according to the present disclosure may further include a support structure 222 at the rear end of the support beam 212, which extends from the first support leg 214 to the second support leg 216 along the horizontal direction H. The support structure 222 may be configured to mount a printed circuit board (PCB) component 300 that includes a plurality of printed tuning elements. In some embodiments, the PCB component 300 may be constructed as an elongated PCB component 300 on which a column of tuning elements in the array of metal tuning elements 200 may be printed. As shown in FIG. 6, the PCB component 300 may include a column of tuning elements-metal patterns of specific shapes printed on the dielectric layer at a distance from each other. It should be understood that the shapes of the tuning elements can be varied. FIGS. 7*a*, 7*b*, 7*c*, 7*d*, 7*e*, 7*f* and 7*g* show seven exemplary variant schemes of metal tuning elements, namely, rectangular, trapezoidal, triangular, elliptical, L-shaped, T-shaped and I-shaped etc., The extension size of the tuning element on the longitudinal axis M (that is, the extension size in the forward direction F of the base station antenna) can be larger than its lateral extension size (that is, the extension size in the longitudinal direction V of the base station antenna), so that the tuning element can provide a smaller projection component along the longitudinal direction V at a smaller horizontal scanning angle and a larger projection component along the horizontal direction H at a larger horizontal scanning angle.

In some embodiments, the extension size on the longitudinal axis M of the tuning element is in the range of 0.1~0.5, 0.15~0.4 or about 0.25 wavelength length, which is the wavelength corresponding to the center frequency wavelength of the operating band of the radiating element 123 in the active antenna 120.

With continued reference to FIGS. 4 and 5, the PCB component 300 may extend from the support structure 222 of the first support frame to the support structure 222 of the second support frame in the longitudinal direction V and be fixed on the corresponding support structure 222. A plurality of PCB components 300 arranged side by side with each other along the horizontal direction H can be mounted on the plurality of support frames 210, and each PCB component 300 may be printed with a column of tuning elements, thereby forming an array of metal tuning elements 200. In the present disclosure, each support frame 210 can be used not only to support the front radome of the passive antenna device 110 but also to mount the array of metal tuning elements 200. Thus, the required metal tuning element array 200 can be formed by a method characterized by simple structure, convenient installation and high manufacturing efficiency.

In some embodiments, in order to fix the corresponding PCB component 300, the support structure 222 may include a first support sheet 224 and a second support sheet 226 which are in front-rear superimposition and spaced apart by a distance, and the PCB component 300 is installed between the first support sheet 224 and the second support sheet 226. The PCB component 300 may be installed between the first support sheet 224 and the second support sheet 226 by any feasible fixing means such as screw connection, clamping, embedding or bonding.

It should be understood that the specific configurations of the support structures 222 for fixing the corresponding PCB components 300 can be varied, as long as the corresponding tuning elements can be fixed, which should not be understood in a limited way here.

Figure 9:
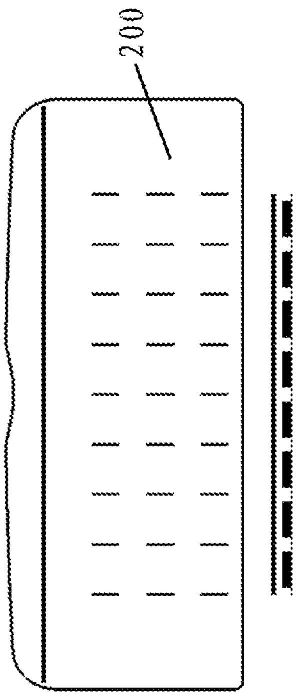
FIG. 9 shows a schematic bottom view of the second variant scheme of the integrated base station antenna according to some embodiments of the present disclosure, in which three tuning element arrays in front-rear superimposition are schematically shown.
Figure 8:
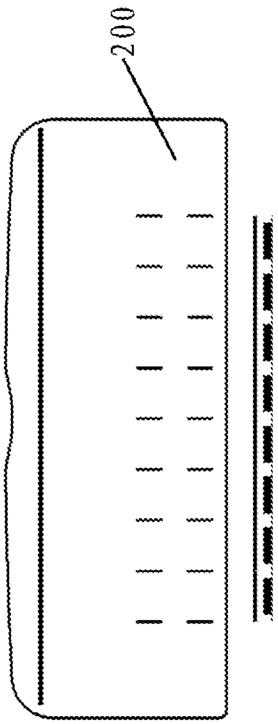
FIG. 8 shows a schematic bottom view of the first variant scheme of the integrated base station antenna according to some embodiments of the present disclosure, in which two tuning element arrays in front-rear superimposition are schematically shown.
Figure 10:
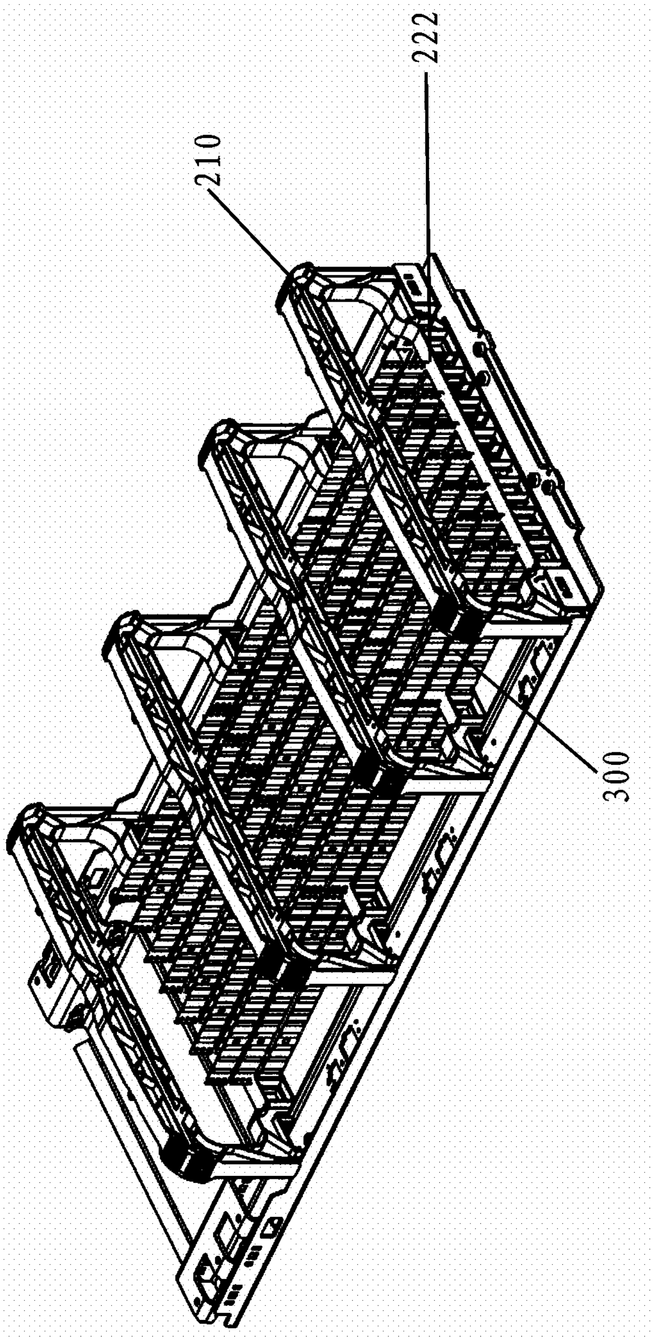
FIG. 10 shows a partial perspective view of the integrated base station antenna of FIG. 9.

FIGS. 8 to 10 illustrate alternative schemes for the integrated base station antenna according to some embodiments of the present disclosure. FIG. 8 is a schematic bottom view of a first variant scheme in which two metal tuning element arrays 200 in front-rear superimposition are schematically shown. FIG. 9 is a schematic bottom view of a second variant scheme in which three metal tuning element arrays 200 in front-rear superimposition are schematically shown. FIG. 10 is a partial perspective view of the integrated base station antenna of FIG. 9.

Different from the embodiments described above, a plurality of metal tuning element arrays 200 used for the active antenna 120 are installed in the passive antenna 110, which are in front-rear superimposition and spaced apart by a distance, so as to adjust at least the projection component of the tuning element at large horizontal scanning angles, thereby further improving the cross-polarization performance of the active antenna 120.

As shown in FIG. 10, in order to form the plurality of metal tuning element arrays 200, arrays of PCB components 300 can be installed on a plurality of support frames 210, said PCB components 300 including a plurality of PCB components 300 arranged side by side with each other along the horizontal direction H and a plurality of PCB components 300 arranged side by side with each other along the forward direction F. A column of metal tuning elements can be printed on each PCB component 300.

In other embodiments, in order to form the plurality of metal tuning element arrays 200, a plurality of columns of metal tuning elements superimposed in an upper-lower way and spaced apart by a distance can be printed on each PCB component 300. Thus, the plurality of metal tuning element arrays 200 are formed by a plurality of PCB components 300 arranged side by side with each other in the horizontal direction.

Although some specific embodiments of the present disclosure have been described in detail through examples, those skilled in the art should understand that the above examples are only for illustration rather than for limiting the scope of the present disclosure. The embodiments disclosed herein can be combined arbitrarily without departing from the spirit and scope of the present disclosure. Those skilled in the art should also understand that various modifications can be made to the embodiments without departing from the scope and spirit of the present disclosure. The scope of the present disclosure is defined by the attached claims.

That which is claimed is:

1. An integrated base station antenna, comprising:

a passive antenna; and an active antenna installed behind the passive antenna, the active antenna comprising a reflecting plate and an array of radiating elements extending forward from the reflecting plate, wherein an array of metal tuning elements used for the array of radiating elements is mounted in the passive antenna, the array of metal tuning elements positioned in front of the array of radiating elements of the active antenna, and wherein a longitudinal axis of at least one of the metal tuning elements extends at an angle between 70° and 110° with respect to a plane defined by the reflecting plate.

2. The integrated base station antenna according to claim 1, wherein each metal tuning element is electrically floating.

3. The integrated base station antenna according to claim 1, wherein the passive antenna comprises a front radome and a rear radome, and the array of metal tuning elements is installed between the front radome and the rear radome.

4. The integrated base station antenna according to claim 3, wherein the passive antenna further comprises a matching dielectric layer between the front radome and the rear radome, and the array of metal tuning elements is installed between the matching dielectric layer and the rear radome.

5. The integrated base station antenna according to claim 4, wherein within a region corresponding to the active antenna, a first distance between the rear radome of the passive antenna and the matching dielectric layer is 0.25+n/2 times that of the equivalent wavelength, where n is a positive integer, and a second distance between the active antenna and the rear radome of the passive antenna is 0.25+N/2 times of the equivalent wavelength, where Nis a natural number, where the equivalent wavelength is a wavelength within the range of 0.8 to 1.2 times a wavelength corresponding to the center frequency of an operating frequency band of the radiating elements in the active antenna.

6. The integrated base station antenna according to claim 5, wherein a distance between the matching dielectric layer and the front radome of the passive antenna is 0.25+M/2 times the equivalent wavelength, where M is a natural number, and the dielectric constant of the matching dielectric layer is larger than the dielectric constant of air.

7. The integrated base station antenna according to claim 3, wherein a support frame for the front radome is installed in the passive antenna and a metal tuning element is installed on the support frame.

8. The integrated base station antenna according to claim 7, wherein a PCB component is mounted on the support frame and metal tuning elements are printed on the PCB component.

9. The integrated base station antenna according to claim 8, wherein a plurality of PCB components arranged side by side with each other along a horizontal direction of the integrated base station antenna are mounted on the support frame.

10. The integrated base station antenna according to claim 8, wherein a PCB component array is mounted on the support frame, and the PCB component array comprises a plurality of PCB components arranged side by side with each other in a horizontal direction of the integrated base station antenna and a second plurality of PCB components mutually superimposed in a forward direction.

11. The integrated base station antenna according to claim 8, wherein the support frame comprises a support beam at a front end extending in a horizontal direction, a first support leg extending rearward from a first end of the support beam, a second support leg extending rearward from a second end of the support beam, and a support structure at a rear end; the support structure extends from the first support leg to the second support leg in the horizontal direction, and the PCB component is mounted on the support structure.

12. The integrated base station antenna according to claim 11, wherein the support frame comprises a first support frame and a second support frame spaced apart from the first support frame, and the PCB components extend longitudinally from the support structure of the first support frame to the support structure of the second support frame and are fixed on the corresponding support structure.

13. The integrated base station antenna according to claim 11, wherein a first reflection strip and a second reflection strip are respectively arranged beside the sides of the passive antenna in the horizontal direction, and a first support leg is mounted on the first reflection strip and a second support leg is mounted on the second reflection strip.

14. The integrated base station antenna of claim 1, wherein the array of tuning elements is a multi-column array of tuning elements.

15. The integrated base station antenna of claim 1, wherein a first of the metal tuning elements has a width in a lateral direction of the first of the metal tuning elements that is at least three times smaller than a length of the first of the metal tuning elements in a longitudinal direction of the first of the metal tuning elements, where the lateral direction is perpendicular to the longitudinal direction.

16. The integrated base station antenna of claim 1, wherein the integrated base station antenna has a longitudinal axis that extends in a first direction, and wherein the tuning elements in the array of metal tuning elements are configured to provide a first projection component in the first direction at a horizontal scanning angle larger than a first angle between 41° and 53°, and a second projection component in the first longitudinal direction at a horizontal scanning angle smaller than a second angle between 0° and 12°, the first projection component being larger than the second projection component.

* * * * *